United States Patent

[11] 3,619,812

[72] Inventor John F. Asmus
McLean, Va.
[21] Appl. No. 852,533
[22] Filed Aug. 25, 1969
[45] Patented Nov. 9, 1971
[73] Assignee General Dynamics Corporation
Pomona, Calif.

[54] METALLIC VAPOR LASER
7 Claims, 4 Drawing Figs.
[52] U.S. Cl. .................................................. 331/94.5
[51] Int. Cl. .................................................. H01s 3/22
[50] Field of Search ........................................ 331/94.5

[56] References Cited
OTHER REFERENCES
Leonard: " Design and Use of an Ultraviolet Laser," Laser Focus, Vol. 3, pp. 26– 32, Feb., 1967

Primary Examiner—Ronald L. Wibert
Assistant Examiner—Edward S. Bauer
Attorney—Edward B. Johnson ABSTRACT: The method and apparatus for pulse-broadening metallic vapor lasers having self-terminating laser transitions by flowing excited metal vapor or atoms through an optical resonator. A high-velocity metallic vapor in the form of a plasma coagulum is created by exploding wires and magnetic fields, or by ablating metal through explosive or plasma techniques. When the vapor front reaches the laser chamber, a cross-excitation discharge is initiated along the direction of the flow vector to generate the population inversion as the vapor flows across the optical axis of the optical resonator.

METALLIC VAPOR LASER

BACKGROUND OF THE INVENTION

Conventional metallic vapor lasers that use metal vapors, such as copper, gold, lead and other suitable metals, comprise an electrical discharge tube placed between laser mirrors with the metal positioned in the tube. The tube is then maintained at an elevated temperature so that some of the metal inside the tube will vaporize, forming the lasing gas. A high voltage is discharged in pulses that raises the lasing vapor to the upper laser level. The lasing gas then relaxes in place giving off energy in the form of light or laser photons.

In experimental work with metallic or metal vapor lasers, it has been found that metallic vapors from metals such as gold, nickel, copper, lead, manganese and cadmium have a three-level energy system, which provides an efficient laser action, and also have self-terminating characteristics. Copper for example, has a particularly efficient three-level energy system. The laser action in high-voltage pulsed discharges in copper vapor on the 5,106 Angstrom and 5,782 Angstrom transitions is described in reports of the work of W. T. Walter, N. Solimene and M. Piltch in an article on page 474 of the Sept. 1966 issue of the IEEE Journal of Quantum Electronics, titled "6C3-Efficient Pulsed Gas Discharge Lasers" and in reports of the work of Donald A. Leonard in an article on page 380 of the Sept. 1967 issue of IEEE Journal of Quantum Electronics, titled "A Theoretical Description of the 5,106-A Pulsed Copper Vapor Laser." It may be understood from these articles that copper vapor is a self-terminating laser that has a particular advantageous lasing potential, because about two-thirds of the excitation energy is returned by the laser photon and the level structure is remarkably free of other levels and their possible dissipative influence. The latter contributes to high efficiency by minimizing the number of competing parallel paths for energy loss.

Because of these advantages of metallic vapor lasers and particularly copper vapor lasers, experimental work has been expended to increase the average power from metallic vapor lasers. This work has been directed primarily to increasing the average power from metallic vapor lasers by increasing the pulse repetition rate while maintaining a high peak pulse power and maintaining a high tube temperature.

It is thus advantageous to provide a metallic vapor laser in which the metal is vaporized in a manner not directly resulting from heating the tube and the excited metallic vapor is caused to flow through an optical resonator. This allows laser action to last during substantially the time of passage of the metal vapor across the optical axis of the resonator, which can be orders of magnitude longer than the intrinsic pulse length for a stationary metal vapor, thus increasing the energy that may be extracted.

SUMMARY OF THE INVENTION

In illustrative embodiments of this invention, excited metallic vapors flow in a high-velocity vapor front through an optical resonator or laser chamber where a cross-discharge excitation is initiated along the direction of the flow vector to generate the population inversion that raises the metal vapor to the upper energy level. The particular metals used in the metallic vapor lasers of this invention are those that have resonant radiation levels leading to self-terminating laser transitions. In one mode of the invention, a plasma coagulum of the metal vapor is created by exploding a wire of the desired metal to the metal vapor form in a magnetic field that accelerates the plasma coagulum through a plasma gun or a plurality of plasma guns into a high-velocity vapor front that passes into a laser chamber. The exploding and acceleration forces are created by a single high-voltage discharge. A second high-voltage discharge of shorter duration is then applied across the laser chamber along the direction of the flow vector of the plasma coagulae creating a cross-discharge excitation that raises the atoms in the metal vapor to the upper energy level. The moving or high-velocity drift of the excited metal vapor then relaxes to the lower laser level producing energy through laser photon or light. A vacuum pump evacuates the cavities and the laser structure volume to a pressure in the order of 10$^1$Torr. A coaxial rail gun may be employed in this magnetohydrodynamic laser mode of operation to focus the plasma.

In another mode of operation, a suitable inert gas is transformed into a high-velocity plasma that flows through a rail gun-type structure and is focused into impacting against an ablating material of copper or other suitable metal material. The impact of the heated plasma causes atoms to be removed from the ablating copper metal surface which atoms move through the optical resonator. A high-voltage, short duration discharge is then applied across the laser chamber in the direction of movement of the ablated metal atoms that creates a cross-discharge excitation of the neutral atoms to the upper energy level. In another embodiment or mode of operation, the high-energy plasma is created by an explosion that through the application of a large amount of instant power, creates a plasma jet that ablates the metal, which ablated neutral atoms are then raised to the higher energy level by the cross-discharge excitation pulse. In these two configurations it may be possible to dispense with the cross-discharge electrical excitation as collisions between plasma atoms and the ablation atoms will result in some excitation of the upper laser level.

Accordingly in this invention, the method and apparatus provides pulse broadening, self-terminating lasers by flowing excited metal vapor through an optical resonator in the manner that the atoms that have relaxed to the lower laser level are continuously swept from the resonator volume and replaced by newly excited atoms in a charge transfer acceleration process that can impart a high velocity to an active metal vapor without heating the plasma to an excessive temperature.

It is therefore an object of this invention to provide a new and improved metallic vapor laser method and structure.

It is another object of this invention to provide a new and improved metallic vapor laser that increases the temporal duration of an individual pulse.

It is another object of this invention to provide a new and improved metal vapor laser in which the metal vapor laser action is created without the necessity of applying high temperatures to the laser structure and chamber.

It is another object of this invention to provide a new and improved metal vapor laser in which the metal vapor laser action is created by means of atomic collisions without the necessity of applying an electrical discharge.

Other objects and many advantages of this invention will become more apparent upon a reading of the following detailed description and an examination of the drawings wherein like reference numerals designate like parts throughout and in which.

In the embodiments of this invention, the metallic vapor lasers are particularly adapted to be used in vaporizing metals that have metal vapor resonance radiation levels leading to self-terminating laser transitions. The examples of such metals are gold, nickel, copper, lead, manganese and cadmium. The particular metal used in the illustrative embodiments in FIGS. 1, 2, 3 and 4 is copper.

Figure 1:
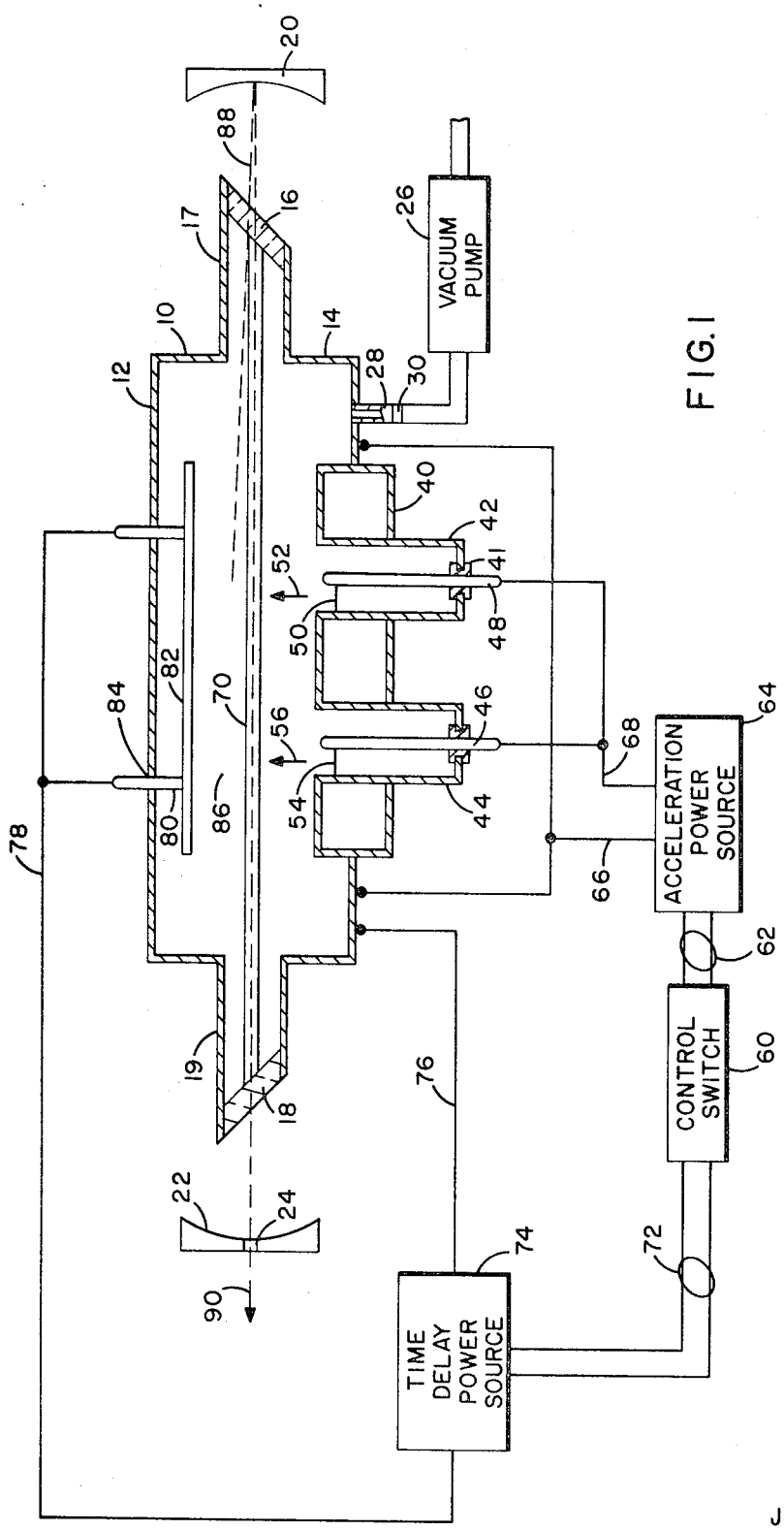
FIG. 1 is a sectional view with parts broken away and parts in block diagram of a magnetohydrodynamic laser embodiment of the invention utilizing the exploding wire technique.

Referring to FIG. 1, the laser structure 10 comprises an upper longitudinal housing 12 made of any suitable metal, such as aluminum, that mates with a lower housing 14 in a substantially square configuration. The sides of the upper housing 12 are separated from the sides of the lower housing 14 by an insulator section 70. Transparent quartz windows 16 and 18 are positioned in each end of extensions 17 and 19 to pass light to the mirrors 20 and 22. The central volume of the two compartments 12 and 14 form the optical resonator or laser chamber 86 of the laser structure 10. The lower housing 14 has a vacuum pump 26 that through line 28 draws a vacuum in the sealed volume 86. An insulator section 30 insulates the vacuum pump line from charges that may develop in the aluminum housing 14. The lower housing 14 has cylindrical cavities or barrels 42 and 44 that are supported by frame structures 40. Positioned in barrels 42 and 44 are conductor members 46 and 48 that pass through an insulated and sealed support 41 into the volume 86. Copper wires 50 and 54, that may have a diameter ranging from about 0.012 to 0.02 thick and ranging from ½ to 1 inch long, are secured between the conductors 46 and 48 and the sides of the cavities 42 and 44 in any known suitable manner. The wires 50 and 54 are normally aligned with the optical axis of the optical resonator or laser chamber. It may be understood that the housing structure may have any length necessary to accommodate the barrels 42 and 44. While two barrels 42 and 44 are illustrated in the embodiment of FIG. 1, there may be any reasonable number of such barrels. While only single wires 50 and 54 are illustrated in the embodiment, it may be understood additional wires may be connected between the respective electrodes 46 and 48 and the barrels 42 and 44. However it is preferable that these wires have their longitudinal length substantially in line with the longitudinal length of the volume 86. The respective conductors 46 and 48 are connected to one side of the power line 68 from the acceleration power source 64. The ground line 66 of the acceleration power source 64 is connected to the lower housing portion 14.

Positioned opposite the barrels 42 and 44 is a conductor plate 82 that has a relatively narrow width and a length that extends substantially the length of the volume 86. Conductor plate 82 is connected to conductors 80 that project through the upper housing portion 12 and are electrically connected to the upper housing portion 12 at 84. A time delay power source 74 is connected through line 78 to conductors 80 with the ground line 76 connected to the lower housing portion 14. A control switch 60, through lines 62 and 72, switches on the acceleration power source 64 and the time delay power source 74. The acceleration power source 64 and the time delay power source 74 comprises known power circuits, such as for example capacitor banks that use ignitrons for timing and switching purposes, which power circuits are capable of providing large power outputs in the order of 10,000 to 20,000 volts for short time lengths, such as 50 nanoseconds to 20 microseconds. The vacuum pump 26 maintains a vacuum in the order of $10^{15}$ Torr. It has been found that the background gas pressure should not appreciably exceed $10^{15}$ Torr. At higher pressures the exploding wire current may not remain confined to the wire and cold metal fragments can be thrown into the laser cavity.

In operation of the embodiment illustrated in FIG. 1, the wires 50 and 54 are placed in position. The vacuum pump 26 draws the vacuum to about $10^{15}$ Torr. The control switch 60 than switches on the acceleration power source 64 and the time delay power source 74. The acceleration power source 64 supplies a high-voltage output pulse in the order of 10 kv. to the conductors 46 and 48 through line 68, which pulse may last for about 10 microseconds. This electrical discharge explodes the copper wires and accelerates the resulting copper vapor plasma coagulae out of the barrels 42 and 44 in the direction of arrows 52 and 56 into the laser chamber volume 86. A field is created by the charge, through the end of the conductor, for example conductor 48, and through the structure 40 and back to the other end of the conductor. When the resulting high-velocity copper vapor front reaches the laser chamber volume 86, a second discharge is applied along the direction of the flow vector 52 and 56 across the optical axis of the system. This second discharge is initiated by the time delay power source 74 through line 78 to conductors 80 and conductor plate 82. The time delay power source has any suitable known time delay circuitry and its discharge is timed to occur several microseconds after the initiation of the exploding wire pulse. The time delay power source discharges about 15 to 20 kv. across the laser channel to the ground housing portion 14 and induces a population inversion in the neutral atoms within the high-velocity copper vapor plasma. The duration of this cross-discharge excitation is about 100 nanoseconds and should be a short pulse because the self-terminating laser transitions are self-extinguishing and thus require a fast rise time to raise the atoms to the upper level at a rate faster than the self-extinguishing rate. The interim time between the two pulses is not normally critical as long as it is timed to the passage of the plasma coagulae out of the barrels and into the optical resonator volume 86. The excited copper vapor plasma that has been raised to the upper transition energy level, provides power output in the form of laser photons when the atoms relax from the upper resonant level to the lower energy level.

The power discharge of the acceleration power source through line 68 creates a magnetic field which imparts a high velocity to the partially ionized copper plasma coagulae through a charge transfer acceleration process without requiring excessive temperature to be applied to the upper and lower housing portions 12 and 14. The cross-discharge pulse provides population inversion to create the laser effect in the self-terminating laser transitions. This provides a pulse duration from the self-terminating laser transitions that is increased substantially by imparted a directed velocity to the active medium in a laser structure that did not require excessive temperatures in creating the plasma. Also it is to be noted that in employing metallic vapor lasers that have self-terminating laser transitions, that it is desirable to be able to remove the lower level atoms that have already lased, because they have the capacity of absorbing energy and quenching the lasing action. Accordingly, the high-velocity flow of the plasma coagulae that has been raised to the upper energy level across the optical axis of the optical resonator causes a high-velocity flow of the lased atoms away from the optical axis.

The light given off by the laser action passes through windows 16 and 18 and is reflected by mirrors 20 and 22 to pass through opening 24 in a light beam 90 in the known manner.

Figure 2:
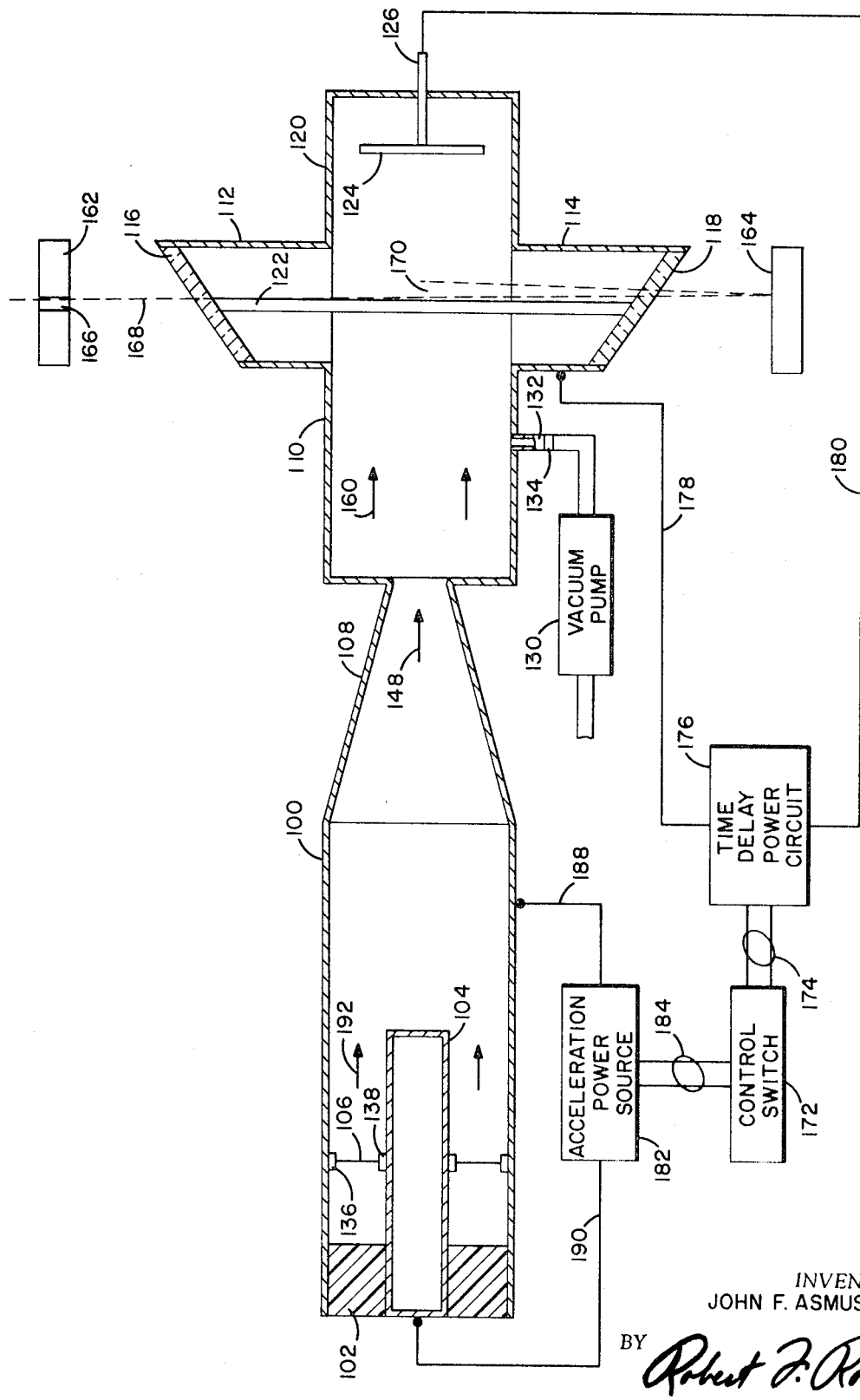
FIG. 2 is a sectional view with parts broken away and parts in block diagram illustrating a modified embodiment of the invention employing the exploding wire technique and a coaxial rail gun.

In FIG. 2, a coaxial rail gun comprises a cylindrical housing 100 with a conical neck portion 108 that provides a reduced diameter opening into a drift tube 110 that is mated to a laser tube 112. The portion 120 of the laser tube 112 is insulated from portion 110 by an insulating section 122 of any suitable insulating material. The rail gun, drift tube and laser tube may be made of any suitable metal, such as aluminum. The laser tube has quartz windows 116 and 118 that pass light to mirrors 162 and 164. The coaxial rail gun portion 110 has cylindrical member 104 positioned therein that is supported by an insulating ring 102. Wires 106, that may be wires of any of the metals that have self-terminating laser transitions, are connected in connectors 136 and 138 and thus are electrically connected between cylinder 104 and the housing of the rail gun 100. A plurality of wires 106 may be positioned entirely around the circumference of the cylinder 104 in the manner illustrated. The connectors 136 and 138 allow easy insertion and connection of the wires 106 in the coaxial rail gun 100. The wires 106 have the size substantially as previously described relative to the embodiment of FIG. 1.

The control switch circuit 172 through lines 174 and 184 switches on the time delay power circuit 176 and 182 in the manner previously described. The acceleration power source provides the high-voltage discharge, in the order of 10 kv., through lines 190 and 188. This creates a discharge from the cylinder 104 through wires 106 to the housing of the rail gun 100 and through the line connection 188 that explodes the wires 106 vaporizing the metal. The discharge further creates a field in the coaxial rail gun 100 from the potential differences across the space between the cylinder 104 and the housing 100 that aids in creating the plasma coagulae and a magnetic field which accelerates the plasma coagulae in the direction of arrow 148 into the drift tube 110. The focusing cone 108 focuses the plasma into the drift tube 110. The resulting high-velocity vapor or plasma front then passes in the direction of arrows 160 into the laser tube 112. When the resulting high-velocity vapor front reaches the laser tube, the second discharge is initiated from the time delay circuit 176 to conductor 112 and conductor plate 124. This creates a cross-discharge excitation to ground line 176 and across the laser tube 112 that induces the inversion transition of the atoms within the high velocity plasma to the laser tube. In the manner previously described, the excited high-velocity plasma then creates power through relaxation of the atoms producing light that is reflected through mirrors 162 and 164 that pass through opening 166. The vacuum pump 130 draws a vacuum through line 132 and insulating section 134 to create a vacuum in the order of $10^{15}$ Torr in the volume of the rail gun, drift tube, and laser tube. The timing and power of the pulses are substantially the same as that previously described relative to the operation of the embodiment of FIG. 1.

Figure 3:
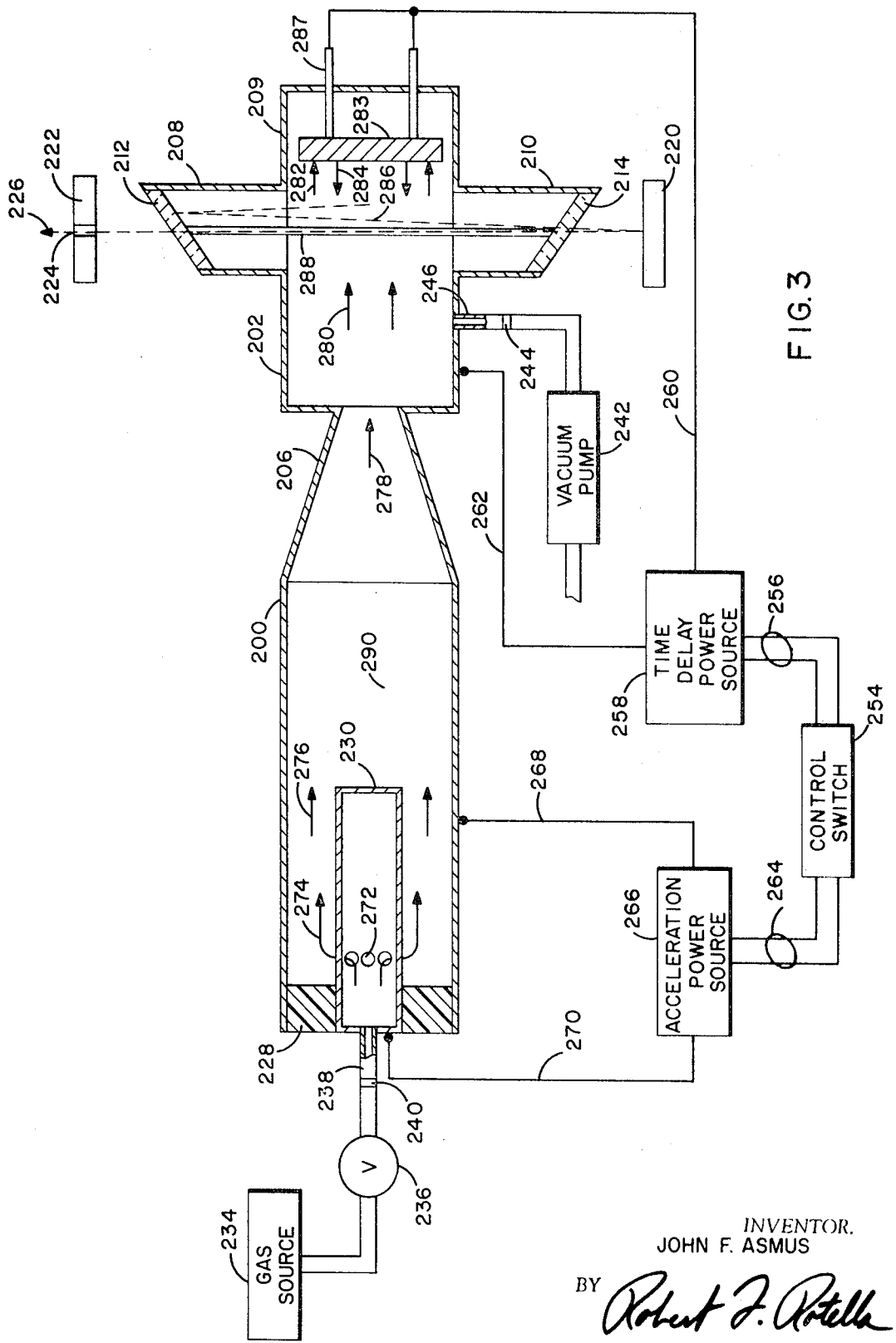
FIG. 3 is a sectional view with parts broken away and parts in block diagram of another embodiment of the invention employing ionized gas in a coaxial rail gun configuration.

Referring now to FIG. 3, a coaxial rail gun-type structure 200 has a generally cylindrical shape with a conical focusing portion 206 that is connected to a drift tube 202 and laser tube 208. The laser tube is divided by an insulating section 288 in the manner previously described relative to the embodiments of FIGS. 1 and 2. Transparent windows 212 and 214 are positioned in the laser tube 208.

In this embodiment, the cylindrical member 230 that is positioned in the coaxial rail gun housing 200 by insulator ring 208, has openings 272 around its circumference. A gas source 234 supplies gas, such as argon or xenon gas or other suitable inert gases, through valve 236 and line 238, having insulating section 240, into the tube 230. The gas passes in the direction of arrows 274 through openings 272 into the cavity of the rail gun housing 200. A vacuum pump 242 draws a vacuum through line 246 and insulating section 244 to the order $10^{15}$ Torr. Positioned in the laser tube 208 is a copper plate 283 that is supported by conductors 287. The plate 283 substantially fills the area of the extended end 209 of the laser tube 208. An accelerating power source 266 is connected through lines 268 and 270 across the cylinder 230 and the housing 200. The time delay power source is connected across the drift tube 202 and the insulated section 210 of the laser tube 208.

In operation of the embodiment of FIG. 3, the vacuum pump 242 is operated to draw the desired vacuum in the volume of the structure, and valve 236 is then opened allowing a slight amount of gas to pass through openings 272 in the direction of arrow 274. The control switch 254 is then closed and through lines 256 and 264 switches on the acceleration power source 266 and the time delay power source 258. The accelerating power source discharges in the manner previously described with the voltage as previously described. This discharge sets up an electrical field in the space between the cylinder 230 and the cylindrical housing 200 that ionizes the gas into plasma and a magnetic field which causes the xenon ions to move in a high velocity in the direction of arrows 276 and 278 through volume 290 and the focusing section 206. The focused and accelerated plasma passes through the drift tube 202 in the direction of arrows 280. The high-velocity plasma ions impact in the direction of arrows 282 against the ablator material 283 causing copper atoms to leave the ablator material 283 surface substantially in the direction of arrows 284. These copper atoms are caused to leave the ablator surface either by heat, impact force, or by the impacting force in an substantially sputtering-type action. The copper atoms then move at a relatively high velocity in the direction of arrows 284 into the central portion of the laser tube 208. The time delay power source 258 then discharges through lines 260 and 262 through conductors 287 creating a cross-discharge excitation across the laser tube and drift tube inducing an inversion transition in the neutral atoms from the ablator material 283 to the upper energy level. The metallic vapor atoms are thus raised to the upper energy level and then relax to the lower energy level producing the laser energy that is processed by mirrors 220 and 222 and through opening 224 to produce the light beam 226 in the manner previously described. In addition collisions between xenon and copper atoms will produce excitation to the upper laser level of the copper which may render the cross-discharge excitation superfluous.

Figure 4:
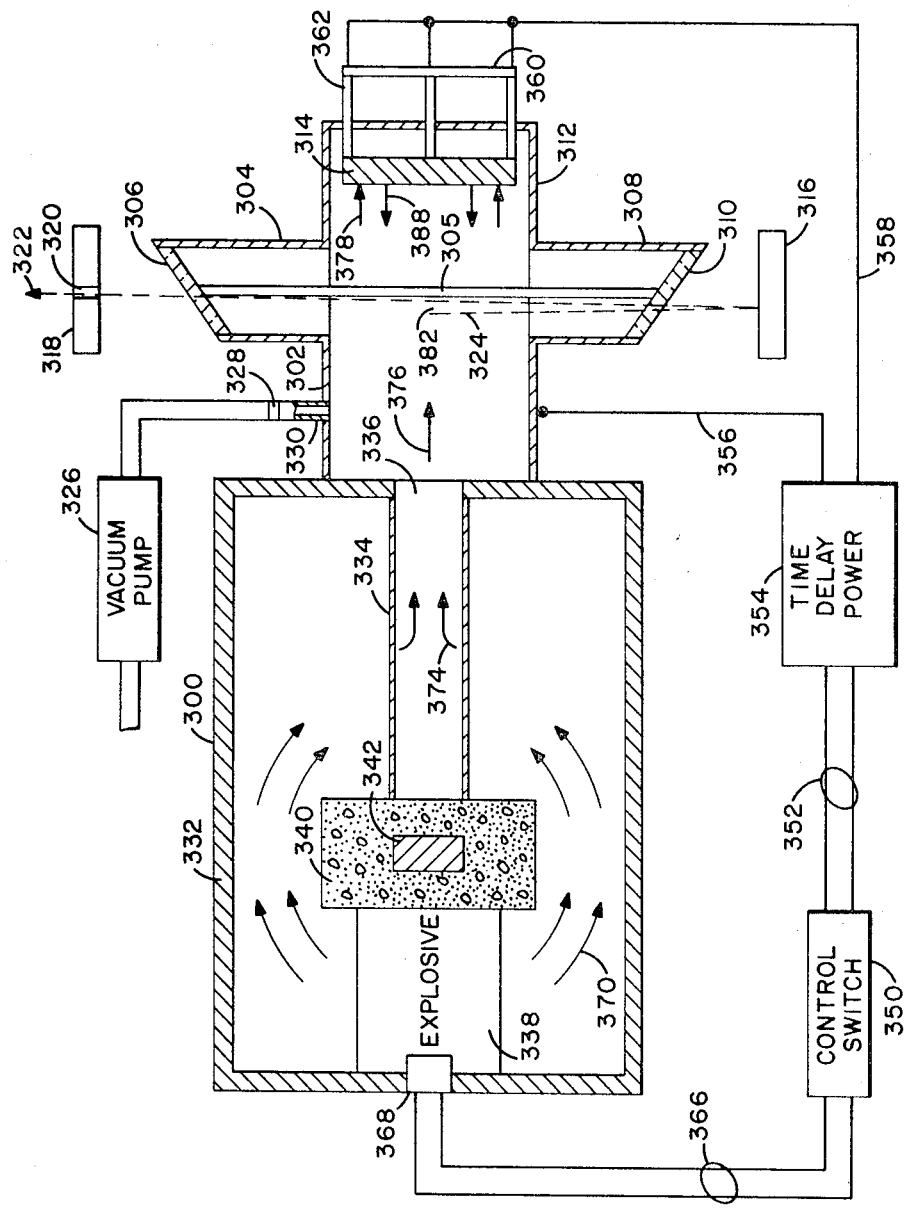
FIG. 4 is a sectional view with parts broken away and parts in block diagram illustrating another embodiment of the invention that employs an explosive-imploding foil.

Referring now to FIG. 4, an imploding foil laser 300 comprises a laser tube 304 connected to a drift tube 302. The laser tube 304 has an insulating section 305 as previously described, wherein the portion 308 of the laser tube is insulated from the other side of the laser tube and the drift tube 302. Positioned in the extended portion 312, the laser tube 304 is a copper ablator material member 314 that substantially fills the area of the extended section 312. Conductors 362 and connecting plate 360 form a rigid support for the ablator material 314 and carry electrical power through line 358 from the time delay power source 354 to the copper ablator material 314.

The drift tube is connected to a metal housing 332 in which is positioned an explosive barrier 340 that may have a metal core 342. The explosive barrier is rigidly secured in the metal housing 332 in any suitable manner, such as by connecting the core member 342 to the outer housing 332. A copper tube 334 is secured between the barrier and the opening 336 in the housing 332. An explosive charge 338, that may comprise any suitable known mild explosive, such as RDX or PETN, has a primer 368. It may be understood that the barrier 340 may comprise concrete 340 with a metal core member 342 or plaster of paris 340 and the core 342 comprising lead shot.

In operation, the vacuum pump 326 draws a vacuum through line 330 and insulator section 328 in the volume of the drift tube 302, the laser tube 304, and the copper tube 334. It may be understood that the volume within the explosive housing 333 is filled with inert gas such as argon and xenon. The control switch 350 is closed to fire the primer 368. The explosion of the explosive creates a high-temperature, high-velocity force in the gas that moves in the direction of arrows 370 and 322. The high-temperature, high-velocity wave implodes and vaporizes the copper tube 334 into a plasma jet that moves through opening 336 in the direction of arrows 374 and 376. This plasma jet contacts the surface of the ablator material 314 in the direction of arrows 378 and causes copper atoms to be ejected in the direction of arrow 388 from the surface of the ablator material in the manner previously described relative to FIG. 3. The time delay power circuit 354 discharges a power pulse through lines 358 and 356, that passes through conductors 362 and conductor plate 314 to apply the cross-discharge excitation across the laser tube 304 that raises the copper atoms to the upper energy level. The excited copper atoms then relax to the lower energy level in the manner previously described providing power output in the matter previously described that is used by mirrors 316 and 318 to supply a light energy output 322 through opening 320. As described previously atomic collisions can provide an alternate excitation mechanism to the cross discharge.

Having described my invention, I now claim.

1. The method of pulse-broadening metallic vapor lasers comprising the steps of, exploding at least one metal conductor by an electric discharge through the conductor to create the vaporized metal, moving the vaporized metal into a substantially evacuated optical resonator at a high velocity, exciting the metallic vapor into the upper laser level as said metallic vapor is moving into the optical resonator.

2. The method as claimed in claim 1 in which the steps set out in claim 1 include the step of, using said electrical discharge to create a field for creating a plasma of the metal vaporized in the electrical explosion and for moving the plasma to the optical resonator at a high velocity.

3. The method as claimed in claim 2 including the step of, focusing the high-velocity plasma into a concentrated cross-sectional area as the plasma moves into the optical resonator.

4. A laser for pulse-broadening metallic vapor lasers comprising,
   a laser optical resonator having an optical axis and having two parts that are insulated one from the other in a plane parallel to said optical axis,
   cavity means aligned substantially normal to said optical axis and including at least one cavity,
   means for substantially evacuating said optical resonator and said cavity means,
   at least one metal wire positioned in said cavity,
   electrical circuit means for passing a large voltage pulse through said wire, whereby said wire is exploded into a metallic vapor which moves at a high velocity across said optical resonator,
   means responsive to said voltage pulse for creating a field in said cavity that accelerates said metallic vapor as a plasma to a high velocity in the direction of said optical axis,
   means including an electrode positioned adjacent said optical axis and substantially parallel therewith for exciting said metallic vapor to the upper laser level,
   said exciting means including means for discharging a short high-voltage pulse across said optical resonator in the direction of movement of said metallic vapor,
   and timing means for initiating said discharge when the vapor front of said metallic vapor reaches said optical resonator.

5. A laser for pulse-broadening metallic vapor lasers as claimed in claim 4 in which,
   said cavity comprises a cylindrical barrel with an elongated conductor positioned therein on the axis of said barrel,
   said conductor is insulated from said barrel,
   said wire is connected radially between said conductor and said barrel,
   and said electrical circuit means is electrically connected across said conductor and said barrel.

6. A laser for pulse-broadening metallic vapor lasers as claimed in claim 5 in which,
   said cavity means includes a second cavity positioned opposite said barrel across said optical axis,
   and said electrode is positioned in said second cavity.

7. A laser for pulse-broadening metallic vapor lasers as claimed in claim 6 in which,
   said barrel comprises a coaxial rail gun with a conical neck at the connection of said cavity to said optical resonator.